United States Patent [19]

Feldman et al.

[11] 4,331,575
[45] May 25, 1982

[54] DRIER SYSTEMS AND SURFACE-COATING COMPOSITIONS CONTAINING SAME

[75] Inventors: Martin L. Feldman, East Brunswick; Marvin Landau, North Bergen, both of N.J.

[73] Assignee: Tenneco Chemicals, Inc., Piscataway, N.J.

[21] Appl. No.: 249,758

[22] Filed: Apr. 1, 1981

Related U.S. Application Data

[63] Continuation-in-part of Ser. No. 901,153, Apr. 28, 1978, abandoned.

[51] Int. Cl.³ .................... C09D 3/26; C09D 3/64; C09F 9/00
[52] U.S. Cl. .................... 106/264; 106/310; 260/DIG. 25; 525/444.5
[58] Field of Search .................. 260/22 CA, DIG. 25; 106/310, 264

[56] References Cited

U.S. PATENT DOCUMENTS

| | | | |
|---|---|---|---|
| 1,933,520 | 10/1933 | Bruson | 106/310 |
| 2,044,968 | 6/1936 | Bruson | 106/310 |
| 2,251,798 | 8/1941 | Meidert et al. | 106/310 |
| 2,456,824 | 12/1948 | Fischer | 106/310 |
| 2,739,902 | 3/1956 | Mack et al. | 106/310 |
| 2,807,553 | 9/1957 | Fischer | 106/310 |
| 3,211,768 | 10/1965 | Considine | 260/45.75 T |
| 3,467,610 | 9/1969 | Fiarman et al. | 260/22 CA |
| 3,901,837 | 8/1975 | Gottesman et al. | 106/264 |
| 3,962,298 | 6/1976 | Cukor et al. | 252/300 R |

FOREIGN PATENT DOCUMENTS 466046  9/1928  Fed. Rep. of Germany ........ 260/22 CA

OTHER PUBLICATIONS

Chatfield, Varnish Constituents, Leonard Hill Limited, London, 1953, pp. 553-556, 562 & 581.
Singer, Fundamentals of Paint, Varnish, and Lacquer Technology, American Paint Journal Company, St. Louis, MO, 1957, pp. 45-51.

Primary Examiner—Ronald W. Griffin
Attorney, Agent, or Firm—Evelyn Berlow

[57] ABSTRACT

Drier systems for surface-coating compositions that contain oxidizable, organic, film-forming resinous vehicles and that air dry in 24 hours or less at temperatures not higher than 50° F. and at relative humidities above 50% comprise metal salt solutions in an inert solvent that contain an active drier metal, such as cobalt, and an auxiliary drier metal that comprises bismuth.

16 Claims, No Drawings

DRIER SYSTEMS AND SURFACE-COATING COMPOSITIONS CONTAINING SAME

This is a continuation-in-part of our copending application Ser. No. 901,153, which was filed on Apr. 28, 1978 now abandoned.

This invention relates to drier systems for surface-coating compositions that contain oxidizable organic film-forming resinous vehicles and to surface-coating compositions that contain these drier systems.

Drier systems that comprise cobalt, lead, and other metal compounds have long been used in surface-coating compositions that contain oxidizable organic vehicles to accelerate the drying process and to promote the polymerization of the vehicles to dry, mechanically-resistant coatings. The drier systems that are most commonly used contain a primary or active drier and a secondary or auxiliary drier. The active driers are strong oxidants that bring about rapid top-dry of the film but have little or no effect on through-dry. The auxiliary driers do not by themselves promote drying, but when used in conjunction with an active drier they promote drying throughout the film and contribute hardness or flexibility to the dry film.

Until recently, lead was the most widely-used auxiliary drier for surface-coating compositions because compositions that contain lead driers dry rapidly under adverse weather conditions, e.g., at temperatures not higher than 50° F. and relative humidities above 50%, as well as under more favorable weather conditions. Because government regulations now require that surface-coating compositions that are to be used as residential paints contain not more than 0.06% lead, it has become necessary to develop drier systems that are as effective as those that contain lead, but do not contain lead or other very toxic materials.

A number of drier systems have been proposed as replacements for lead-containing drier systems in coating compositions that contain an oxidizable resinous binder, but none has proven to be satisfactory for use in coatings that may be applied under adverse weather conditions. For example, drier systems that use zirconium and/or calcium as the auxiliary drier metal have been developed as replacements for lead-containing drier systems. Such systems were disclosed by Mack et al. in U.S. Pat. No. 2,739,902, by Gottesman et al. in U.S. Pat. No. 3,901,837, and by Burger in "Treatise on Coatings", Volume 4, "Formulations", (Marcel Dekker, Inc., New York, 1975), pages 557–568. These replacement drier systems generally give good results in coating compositions that are intended for interior use or for exterior use under moderate weather conditions, but they are not satisfactory as replacements for lead-containing drier systems in housepaints that contain an oxidizable resinous binder, such as linseed oil, and that are to be applied under adverse weather conditions, for example, at temperatures not higher than 50° F. (10° C.) and relative humidities above 50%. Such conditions occur, for example, in the northern portions of the United States during the autumn months. Under these conditions, surface-coating compositions that contain as driers cobalt and zirconium and/or calcium air dry too slowly to be useful commercially.

Bismuth salts of organic acids and their use as driers for surface-coating compositions are known in the art. For example, bismuth salts of alkylated salicylic acids were disclosed by Bruson in U.S. Pat. No. 1,933,520 as being useful as driers, particularly in marine coatings where they also serve as repellents of marine organisms. Meidert et al. in U.S. Pat. No. 2,251,798 disclosed a number of polyvalent metal salts of branched-chain carboxylic acids obtained by alkaline oxidation of primary alcohols at elevated temperatures and pressures and reported that these salts are useful as driers for varnishes and lacquers. The bismuth salt was said to be less suitable than, for example, the cobalt, lead, and zinc salts because of its high cost. Processes for the production of bismuth salts of various organic acids were disclosed by Bruson in U.S. Pat. No. 2,044,968, by Considine in U.S. Pat. No. 3,211,768 and by Cukor et al. in U.S. Pat. No. 3,962,298. According to German Pat. No. 460,046, the hardness of dried films of paints, varnishes, and boiled oils can be increased by the use of drier systems prepared by heating and reacting certain cobalt and bismuth compounds in a ratio that provides 3 to 4 parts of cobalt metal per part of bismuth metal with a drying oil or resin.

Drier systems have now been developed that are at least as effective as conventional lead-containing drier systems in promoting the air-drying of surface-coating compositions. These drier systems comprise an active drier metal, such as cobalt, and an auxiliary drier metal that contains 10% to 100% by weight of bismuth and 0 to 90% by weight of a second metal that is preferably calcium. Surface-coating compositions that contain these drier systems are comparable to the corresponding compositions in which lead is the auxiliary drier metal in both drying time and film properties when the compositions are dried under either favorable or adverse weather conditions. The surface-coating compositions of this invention are superior to the lead-containing compositions in that they do not contain any component that is known to be very toxic and whose use has been limited or prohibited by government regulations.

The surface-coating compositions of this invention comprise an oxidizable organic film-forming resinous vehicle, 0.02% to 0.2%, based on the weight of vehicle solids of an active drier metal such as cobalt, manganese, iron, cerium and other lanthanides, and mixtures thereof, and 0.05% to 5.0%, based on the weight of vehicle solids, of auxiliary drier metal that contains 10% to 100% by weight of bismuth and 0 to 90% by weight of calcium, barium, zinc, zirconium, lead, or a mixture of these metals. When the auxiliary drier metal is a mixture of bismuth and lead, the amount of lead in the surface-coating composition must be less than the maximum permitted by government regulations. The surface-coating compositions preferably contain 0.03% to 0.08% of an active drier metal and 0.05% to 0.30% of one of the aforementioned auxiliary drier metals. Particularly advantageous results have been obtained when the surface-coating composition contained 0.03% to 0.08% of cobalt and either 0.05% to 0.30% of bismuth or a mixture of 0.05% to 0.20% of bismuth, and 0.02% to 0.10% of calcium, all percentages being based on the weight of resinous vehicle solids. The surface-coating compositions usually contain a larger percentage by weight of the auxiliary drier metal than of the active drier metal.

The novel surface-coating compositions can be prepared by incorporating in the compositions the appropriate amounts of the metal salts, mixtures of the metal salts, or solutions containing one or more of the metal salts. They are preferably prepared by incorporating in the surface-coating composition from 0.02% to 5%, based on the weight of the resinous vehicle, of a drier system that comprises the appropriate amounts of an active drier metal and an auxiliary drier metal that is either bismuth or a mixture of bismuth and another auxiliary drier metal. The drier systems of this invention comprise a metal salt component that contains a minor amount, that is, less than 50% by weight, of an active drier metal and a major amount, that is, more than 50% by weight, of an auxiliary drier metal that comprises bismuth and an inert non-polar organic solvent. They may contain from 1% to 16% by weight of active drier metal and from 6% to 36% by weight of auxiliary drier metal. They preferably contain from 5% to 7% by weight of active drier metal and 18% to 30% by weight of auxiliary drier metal.

In a preferred embodiment of the invention, the drier systems comprise (a) a metal salt solution that contains from 6% to 15% by weight of an active drier metal that is cobalt, manganese, iron, cerium and other lanthanides, or a mixture thereof in an inert, non-polar organic solvent and (b) a metal salt solution that contains from 10% to 30% by weight of auxiliary drier metal that contains from 10% to 100% by weight of bismuth and 0 to 90% by weight of calcium, barium, zirconium, zinc, lead, or a mixture thereof in an inert, non-polar organic solvent. Best results have been obtained using drier systems that comprise (a) a solution containing at least one cobalt salt in mineral spirits that contains from 10% to 12% by weight of cobalt and (b) a solution containing at least one bismuth salt in mineral spirits that contains from 20% to 25% by weight of bismuth or a solution containing at least one bismuth salt and at least one calcium salt in mineral spirits that contains 10% to 18% by weight of bismuth and 1% to 8% by weight of calcium.

The components of these drier systems may be combined into a single metal salt solution, or they may be added separately to the surface-coating compounds in amounts that will result in the formation of surface-coating compositions that contain from 0.02% to 0.2%, based on resinous vehicle solids, of the active drier metal and 0.05% to 0.50%, based on resinous vehicle solids, of the auxiliary drier metal, preferably in amounts that will result in the formation of surface-coating compositions that contain from 0.03 to 0.08%, based on the weight of resinous vehicle solids, of active drier metals and 0.05% to 0.30%, based on the weight of resinous vehicle solids, of auxiliary drier metal comprising bismuth. It is particularly preferred that the surface-coating compositions contain from 0.03% to 0.08% of cobalt, 0.05% to 0.20% of bismuth, and 0.02% to 0.10% of calcium, said percentages being based on the weight of resinous vehicle solids.

The active and auxiliary drier metals are incorporated into the drier systems or into the surface-coating compositions as oil-soluble metal salts of branched-chain or straight-chain aliphatic monocarboxylic acids having 6 to 22 carbon atoms, cycloaliphatic monocarboxylic acids having 6 to 10 carbon atoms, or mixtures of these acids. Illustrative of these acids are 2-ethylbutanoic acid, 2,2-dimethylpentanoic acid, 2-ethylpentanoic acid, 2-ethyl-4-methylpentanoic acid, 2-ethylhexanoic acid, isooctanoic acid, isononanoic acid, neononanoic acid, isodecanoic acid, neodecanoic acid, 2-ethyldecanoic acid, isotridecanoic acid, isotetradecanoic acid, n-hexanoic acid, n-octanoic acid, n-decanoic acid, n-dodecanoic acid, cyclopentanoic acid, methylcyclopentanoic acid, cyclohexanoic acid, methylcyclohexanoic acid, 1,2-dimethylcyclohexanoic acid, cycloheptanoic acid, and the like. The preferred acids for use in the preparation of the metal salts are the branched-chain aliphatic monocarboxylic acids having 8 to 18 carbon atoms, such as 2-ethylhexanoic acid, isooctanoic acid, 2,2-diethylhexanoic acid, 2-methyl-2-ethylheptanoic acid, 2,2-dimethyloctanoic acid, 2-propylheptanoic acid, 3,5,5-trimethylhexanoic acid, 3-ethyloctanoic acid, isononanoic acid, isodecanoic acid, isododecanoic acid, 2-ethyldodecanoic acid, and tall oil fatty acids; naphthenic acids, such as cyclopentanoic acid, cyclohexanoic acid, cycloheptanoic acid, and methylcyclohexanoic acid; and mixtures of these acids. Particularly preferred acids include 2-ethylhexanoic acid, isononanoic acid, isodecanoic acid, and mixtures thereof.

The novel drier systems are solutions of the metal salts in an inert non-polar organic solvent that is preferably a hydrocarbon or a halogenated hydrocarbon. The preferred solvents include aliphatic and cycloaliphatic hydrocarbons such as hexane, heptane, octane, isooctane, cyclohexane, and cycloheptane; petroleum distillates such as mineral spirits, gasoline, diesel fuel, and fuel oils; aromatic hydrocarbons such as benzene, toluene, xylenes, and ethylbenzenes; and chlorinated compounds such as chlorobenzenes, carbon tetrachloride, and ethylene dichloride. Particularly preferred as the solvent in the drier systems is mineral spirits that is not photochemically reactive as defined in Section (K) of Rule 66 of the County of Los Angeles Air Pollution Control District and that has a distillation range of about 150° to 200° C.

The drier systems may if desired contain an additive that decreases their viscosities. Such additives include the alkyl acid phosphates described in U.S. Pat. No. 2,456,824 and the polyoxyalkylene glycols described in U.S. Pat. No. 2,807,553.

The drier systems of this invention can be used to accelerate the drying rate of a wide variety of surface-coating systems including paints, varnishes, enamels, printing inks, and the like that contain an oxidizable organic film-forming resinous vehicle. The vehicle may be a drying oil or a semi-drying oil, such as linseed oil, soybean oil, tung oil, or dehydrated castor oil in the raw, blown, or heat-bodied form. Alternatively, it may be an alkyd resin or an oleoresinous varnish.

In addition to the oxidizable organic film-forming resinous vehicle and the drier system, the surface-coating compositions may contain pigments, dyes, extenders, solvents, plasticizers, anti-skinning agents, fungicides, and other additives in the amounts ordinarily used in such compositions. Illustrative of the pigments that are used in surface-coating compositions are titanium dioxide, iron oxide, zinc oxide, antimony oxide, kaolin, china clay, calcium carbonate, silica, talc, zinc chromate, carbon black, and mixtures thereof. The useful solvents include benzene, toluene, xylene, naphtha, mineral spirits, hexane, isooctane, and petroleum ether as well as water for water-based surface-coating compositions.

The invention is further illustrated by the following examples.

EXAMPLES 1 AND 2

A. The following drier systems were prepared:
Ex. 1.

(a) A solution containing cobalt 2-ethylhexanoate and cobalt isononanoate in mineral spirits that has a cobalt content of 12% by weight.
(b) A solution containing bismuth 2-ethylhexanoate and bismuth isononanoate in mineral spirits that has a bismuth content of 24% by weight.

Ex. 2.
(a) A solution containing cobalt 2-ethylhexanoate and cobalt isononanoate in mineral spirits that has a cobalt content of 12% by weight.
(b) A solution containing bismuth 2-ethylhexanoate, bismuth isononanoate, calcium 2-ethylhexanoate and calcium isononanoate in mineral spirits that has a bismuth content of 16% by weight and a calcium content of 2% by weight.

For comparative purposes the following drier systems were prepared:

Comp. Ex. A.
(a) A solution containing cobalt 2-ethylhexanoate and cobalt isononanoate in mineral spirits that has a bismuth content of 12% by weight.
(b) A solution containing lead 2-ethylhexanoate and lead isononanoate in mineral spirits that has a lead content of 24% by weight.

Comp. Ex. B. A solution containing cobalt 2-ethylhexanoate, cobalt isononanoate, calcium 2-ethylhexanoate, calcium isononanoate, zirconium 2-ethylhexanoate, and zirconium isononanoate in mineral spirits that has a cobalt content of 0.8% by weight, a calcium content of 2.7% by weight, and a zirconium content of 4.1% by weight.

B. A house paint was prepared by grinding the following materials together in a pebble mill:

| | Parts by Weight |
|---|---|
| Titanium Dioxide (Type IV) | 6.90 |
| Brown Iron Oxide (Class III) | 6.90 |
| Iron Oxide (Class I) | 0.40 |
| Calcium Carbonate | 6.90 |
| Silica and Silicates | 3.90 |
| Soya Alkyd Resin | 17.55 |
| Q-Bodied Linseed Oil | 5.25 |
| Neutral Linseed Oil | 10.50 |
| Bodied Linseed Oil | 2.25 |
| Ester Gum | 4.74 |
| Fungicide (FUNGITROL 11) | 0.51 |
| Mineral Spirits | 34.20 |

To portions of the paint were added either a drier system of this invention or a comparative drier system.

The drying times of the house paints were measured on 2 mil wet films at 70° F. (21° C.) and 50% relative humidity and at 50° F. (10° C.) and 60% relative humidity using Improved Gardner Circular Dry Time Recorders.

The drier systems used, the amounts of the active drier metal and the auxiliary drier metal that were added to the paints, and the results obtained are set forth in Table I.

TABLE I

Air-drying Times of House Paints under Favorable and Adverse Conditions

| Drier System (% Metal based on Paint Vehicle) | Drier System | | Comparative Drier System | |
|---|---|---|---|---|
| | 1 | 2 | A | B |
| Cobalt 2-ethylhexanoate Cobalt isononanoate | 0.045 | 0.045 | 0.045 | 0.045 |
| Bismuth 2-ethylhexanoate Bismuth isononanoate | 0.10 | 0.07 | — | — |
| Calcium 2-ethylhexanoate Calcium isononanoate | — | 0.03 | — | 0.075 |
| Lead 2-ethylhexanoate Lead isononanoate | — | — | 0.45 | — |
| Zirconium 2-ethylhexanoate Zirconium isononanoate | — | — | — | 0.20 |
| Drying Time (Hours:Minutes) at 70° F. (21° C.)/50% Relative Humidity | 9:30 | 8:30 | 8:00 | 9:45 |
| at 50° F. (10° C.)/60% Relative Humidity | 19:00 | 18:15 | 16:00 | >24:00 |

From the data in the table, it will be seen that all of the drier systems were effective when the paints were air-dried under favorable conditions (70° F./50% relative humidity). When the paints were dried under adverse weather conditions (50° F./60% relative humidity), the drier systems of this invention (Examples 1 and 2) were almost as effective as the lead-containing drier system (Comparative Example A), whereas the paint containing the cobalt/zirconium/calcium drier system (Comparative Example B) gave an unsatisfactory performance in that it had not air dried in 24 hours under these conditions, as is required by the industry.

EXAMPLE 3

The drier system of Example 2 that contained cobalt as the active drier metal and bismuth and calcium as the auxiliary drier metal was incorporated into five different types of surface-coating compositions, and the drying times of the resulting compositions were measured on 2 mil wet films at 70° F. and 50% relative humidity and at 50° F. at 70% relative humidity. For comparative purposes, similar tests were carried out with a surface-coating composition that contained cobalt as the active drier metal and zirconium, which is the most commonly-used replacement for lead in drier systems, as the auxiliary drier metal.

The amounts of the active and auxiliary drier metals that were incorporated into the surface-coating compositions and the results obtained are set forth in Table II.

TABLE II

Air-drying Times of Surface-Coating Compositions Under Favorable and Adverse Conditions

| Ex. No. | Drier System (% Metal based on Vehicle Solids) | Type of Surface-Coating Composition | Drying Time at 70° F. (21° C.) at 50% Relative Humidity | (Hours:Minutes) at 50° F. (10° C.) at 70% Relative Humidity |
|---|---|---|---|---|
| 3A | 0.03% Co 0.3% Bi and Ca | Linseed Oil Topcoat | 5:00 | 7:30 |
| Comp. Ex. C | 0.03% Co 0.3% Zr | | 5:00 | 11:00 |
| 3B | 0.03% Co 0.3% Bi and Ca | Linseed Alkyd | 8:00 | 12:30 |

TABLE II-continued

Air-drying Times of Surface-Coating Compositions Under Favorable and Adverse Conditions

| Ex. No. | Drier System (% Metal based on Vehicle Solids) | Type of Surface-Coating Composition | Drying Time at 70° F. (21° C.) at 50% Relative Humidity | (Hours:Minutes) at 50° F. (10° C.) at 70% Relative Humidity |
|---|---|---|---|---|
| | | Primer | | |
| Comp. Ex. D | 0.03% Co 0.3% Zr | | 8:00 | 23:00 |
| 3C | 0.03% Co 0.3% Bi and Ca | Alkyd Modified Oil House Paint | 8:00 | 17:00 |
| Comp. Ex. E | 0.03% Co 0.3% Zr | | 8:00 | 20:00 |
| 3D | 0.2% Co 0.3% Bi and Ca | Long Oil Alkyd Enamel | 5:00 | 13:00 |
| Comp. Ex. F | 0.2% Co 0.3% Zr | | 10:00 | 24:00 |
| 3E | 0.05% Co 0.2% Bi and Ca | Alkyd House Paint | 9:00 | 15:00 |
| Comp. Ex. G | 0.05% Co 0.2% Zr | | 11:00 | 24:00 |

The data in Table II show that the drier system of this invention that contained cobalt, bismuth, and calcium (Examples 3A–3E) was far more effective as a low temperature/high humidity drier for surface-coating compositions than the comparative drier system that contained cobalt and zirconium.

EXAMPLE 4

The drier system of Example 2 that contained cobalt as the active drier metal and bismuth and calcium as the auxiliary drier metal was incorporated into five different surface-coating compositions, and the gloss of dried films of the resulting compositions was determined using a Gardner 60° Precision Gloss Meter, GG 9100 Series. For comparative purposes, the gloss of compositions that contained a cobalt-zirconium drier system was also determined.

The amounts of the active and auxiliary drier metals that were incorporated into the surface-coating compositions and the results obtained are set forth in Table III.

TABLE III

60° Gloss of Films of Surface-Coating Compositions

| Ex. No. | Drier System (% Metal based on Vehicle Solids) | Type of Surface-Coating Composition | 60° Gloss |
|---|---|---|---|
| 4A | 0.04% Co 0.20% Bi and Ca | Long Oil Soya Alkyd | 54 |
| Comp. Ex. H | 0.04% Co 0.20% Zr | | 42 |
| 4B | 0.04% Co 0.20% Bi and Ca | 100% Linseed Oil Paint | 80 |
| Comp. Ex. I | 0.04% Co 0.20% Zr | | 65 |
| 4C | 0.04% Co 0.20% Bi and Ca | Green Pigmented Alkyd Enamel | 86 |
| Comp. Ex. J | 0.04% Co 0.20% Zr | | 83 |
| 4D | 0.04% Co 0.02% Bi and Ca | Bodied Linseed Oil | 67 |
| Comp. Ex. K | 0.04% Co 0.20% Zr | | 56 |
| 4E | 0.04% Co 0.02% Bi and Ca | Long Oil TOFA Alkyd | 85 |
| Comp. Ex. L | 0.04% Co 0.20% Zr | | 79 |

The data in Table III show that films of the compositions that contained the drier system of this invention (Examples 4A–4E) had better gloss than did those of compositions that contained the conventional Co/Zr drier system.

What is claimed is:

1. A drier system for surface-coating compositions that contain oxidizable, organic, film-forming resinous vehicles and that air dry in 24 hours or less at temperatures not higher than 50° F. and relative humidities above 50% that comprises a metal salt component containing
    (a) a minor amount of cobalt and
    (b) a major amount of auxiliary drier metal that contains 10% to 100% by weight of bismuth and 0 to 90% by weight of a metal selected from the group consisting of calcium, barium, zinc, zirconium, lead, and mixtures thereof, said cobalt and auxiliary drier metal being present as salts of acids selected from the group consisting of aliphatic monocarboxylic acids having 6 to 22 carbon atoms, cycloaliphatic monocarboxylic acids having 6 to 10 carbon atoms, and mixtures thereof; and
an inert, non-polar organic solvent.

2. A drier system as set forth in claim 1 that contains from 1% to 16% by weight of cobalt and from 6% to 36% by weight of said auxiliary drier metal.

3. A drier system as set forth in claim 1 that contains 5% to 7% by weight of cobalt and 18% to 30% by weight of said auxiliary drier metal.

4. A drier system as set forth in claim 3 wherein the auxiliary drier metal contains 50% to 100% by weight of bismuth and 0 to 50% by weight of calcium.

5. A drier system as set forth in claim 1 that comprises
    (a) a metal salt solution containing from 6% to 15% by weight of cobalt in an inert, non-polar organic solvent and
    (b) a metal salt solution containing from 10% to 30% by weight of said auxiliary drier metal in an inert, non-polar organic solvent,
said cobalt and auxiliary drier metal being present as salts of acids selected from the group consisting of branched-chain aliphatic monocarboxylic acids having 8 to 18 carbon atoms, naphthenic acids, and mixtures thereof.

6. A drier system as set forth in claim 5 that comprises
   (a) a cobalt salt solution containing 10% to 12% by weight of cobalt in mineral spirits and
   (b) a bismuth salt solution containing 20% to 25% by weight of bismuth in mineral spirits.

7. A drier system as set forth in claim 5 that comprises
   (a) a cobalt salt solution containing 10% to 12% by weight of cobalt in mineral spirits and
   (b) a metal salt solution containing 10% to 18% by weight of bismuth and 1% to 8% by weight of calcium in mineral spirits.

8. A surface-coating composition that air dries in 24 hours or less at temperatures not higher than 50° F. and relative humidities above 50% that comprises an oxidizable, organic, film-forming resinous vehicle; 0.02% to 0.2%, based on the weight of vehicle solids, of cobalt; and 0.05% to 0.50%, based on the weight of vehicle solids, of auxiliary drier metal that contains 10% to 100% by weight of bismuth and 0 to 90% by weight of a metal selected from the group consisting of calcium, barium, zinc, zirconium, lead, and mixtures thereof, said cobalt and auxiliary drier metal being present in the surface-coating composition as salts of acids selected from the group consisting of aliphatic monocarboxylic acids having 6 to 22 carbon atoms, cycloaliphatic monocarboxylic acids having 6 to 10 carbon atoms, and mixtures thereof, and said composition containing a larger percentage by weight of said auxiliary drier metal than of cobalt.

9. A surface-coating composition as set forth in claim 8 that contains 0.03% to 0.08%, based on the weight of resinous vehicle solids, of cobalt and 0.05% to 0.30%, based on the weight of resinous vehicle solids, of an auxiliary drier metal comprising bismuth.

10. A surface-coating composition as set forth in claim 8 that contains 0.03% to 0.08% of cobalt, 0.05% to 0.20% of bismuth, and 0.02% to 0.10% of calcium, said percentages being based on the weight of resinous vehicle solids.

11. A surface-coating composition that air dried in 24 hours or less at temperatures not higher than 50° F. and relative humidities above 50% that comprises an oxidizable, organic, film-forming resinous vehicle and 0.02% to 5%, based on the weight of said vehicle, of a drier system that contains 1% to 16% by weight of cobalt and 6% to 36% by weight of auxiliary drier metal that contains 10% to 100% by weight of bismuth and 0 to 90% by weight of a metal selected from the group consisting of calcium, barium, zinc, zirconium, lead, and mixtures thereof, said cobalt and auxiliary drier metal being present in the drier system as salts of acids selected from the group consisting of aliphatic monocarboxylic acids having 6 to 22 carbon atoms, cycloaliphatic monocarboxylic acids having 6 to 10 carbon atoms, and mixtures thereof, and said drier system containing a larger percentage by weight of said auxiliary drier metal than of cobalt.

12. A surface-coating composition as set forth in claim 11 wherein the drier system contains 5% to 7% by weight of cobalt and 18% to 30% by weight of said auxiliary drier metal.

13. A surface-coating composition as set forth in claim 11 wherein the drier system contains 5% to 7% by weight of cobalt and 18% to 30% by weight of auxiliary drier metal that contains 50% to 100% by weight of bismuth and 0 to 50% by weight of calcium.

14. A surface-coating composition as set forth in claim 11 wherein the active and auxiliary drier metals are present as salts of acids selected from the group consisting of branched-chain aliphatic monocarboxylic acids having 8 to 18 carbon atoms, naphthenic acids, and mixtures thereof.

15. An auxiliary drier metal composition for use in drier systems that is a solution of a metal salt component in an inert, non-polar organic solvent, said metal salt component containing at least one bismuth salt and at least one calcium salt of acids selected from the group consisting of aliphatic monocarboxylic acids having 6 to 22 carbon atoms, cycloaliphatic monocarboxylic acids having 6 to 10 carbon atoms, and mixtures thereof, said composition containing 10% to 18% by weight of bismuth and 1% to 8% by weight of calcium.

16. An auxiliary drier metal composition as set forth in claim 15 that is a solution in mineral spirits comprising at least one bismuth salt and at least one calcium salt of acids selected from the group consisting of branched-chain aliphatic monocarboxylic acids having 8 to 18 carbon atoms, naphthenic acids, and mixtures thereof in mineral spirits, said composition containing about 16% by weight of bismuth and about 2% by weight of calcium.

* * * * *

UNITED STATES PATENT AND TRADEMARK OFFICE
CERTIFICATE OF CORRECTION

PATENT NO. : 4,331,575
DATED : May 25, 1982
INVENTOR(S) : Martin L. Feldman and Marvin Landau It is certified that error appears in the above–identified patent and that said Letters Patent are hereby corrected as shown below:

Column 5, line 21 - change "bismuth" to --cobalt--.

Signed and Sealed this

Eighteenth Day of March 1986

[SEAL]

Attest:

DONALD J. QUIGG

Attesting Officer

Commissioner of Patents and Trademarks